(Model.)

H. D. HICKS.
Belt Tightener.

No. 239,163. Patented March 22, 1881.

WITNESSES:
Francis McArdle
C. Sedgwick

INVENTOR:
H. D. Hicks
BY Munn & Co.
ATTORNEYS.

UNITED STATES PATENT OFFICE.

HORACE D. HICKS, OF WHITEFIELD, NEW HAMPSHIRE.

BELT-TIGHTENER.

SPECIFICATION forming part of Letters Patent No. 239,163, dated March 22, 1881.

Application filed October 4, 1880. (Model.)

*To all whom it may concern:*

Be it known that I, HORACE D. HICKS, of Whitefield, in the county of Coos and State of New Hampshire, have invented a new and Improved Belt-Tightener, of which the following is a specification.

The object of this invention is to provide an improved device for tightening belts without removing or shortening them.

The invention consists of a fixed eccentric on a lever-controlled shaft, and of a lever-controlled eccentric-sleeve fitted loosely on the same shaft, each eccentric forming the central bearing of a pulley, which pulleys are clutched together so that they may be revolved together, though they may be independently moved eccentrically for tightening their respective belts.

Figure 1:
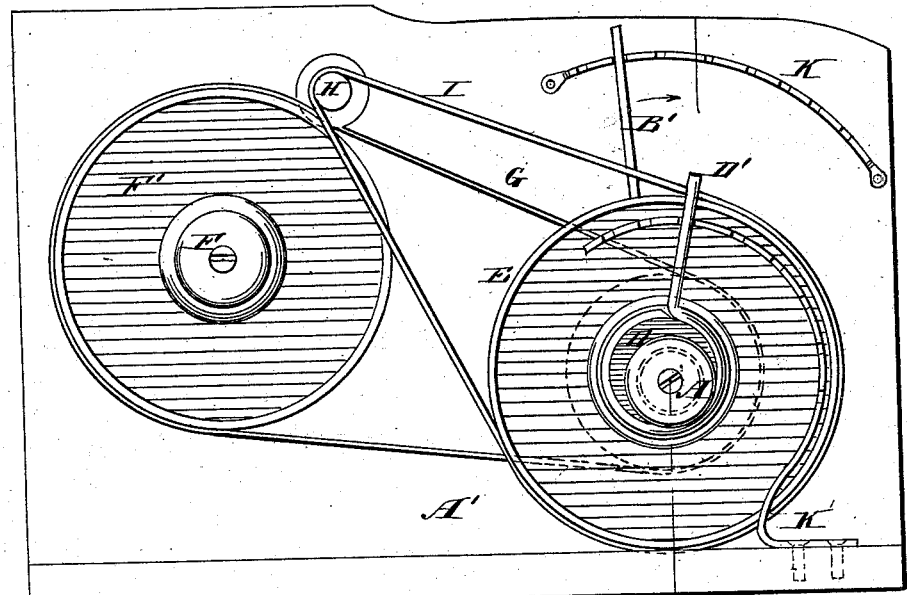
Figure 3:
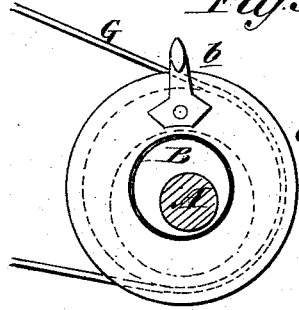
Figure 2:
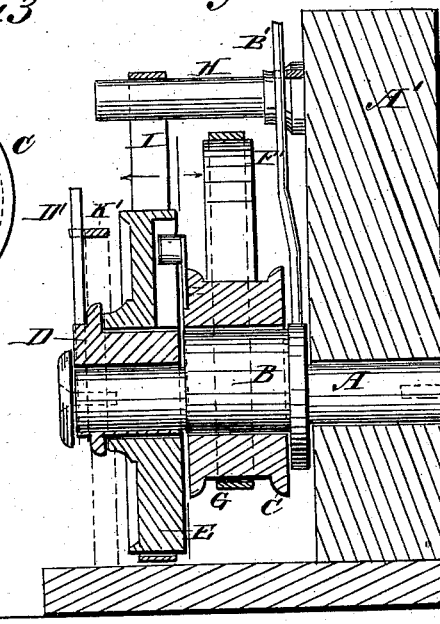
Figure 4:
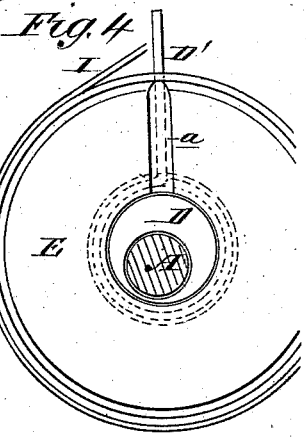

Figure 1 is a front elevation of the device. Fig. 2 is a sectional side elevation of the same on line $x$ $x$, Fig. 1. Fig. 3 is a front elevation of one of the pulleys in position. Fig. 4 is a rear elevation of the other pulley in position.

Similar letters of reference indicate corresponding parts.

In the drawings, A represents a horizontal shaft journaled in a support, A', and having rigidly secured on and about it an eccentric, B, to which is fixed a lever, B', by which it may be turned, and upon this eccentric B is centrally and loosely set a pulley, C.

D is an eccentric-sleeve loosely fitted on the shaft A, and provided with a lever, D', upon which sleeve D a pulley, E, is loosely and centrally mounted. Said pulley E is provided with a radial groove, $a$, for the engagement of the stud or clutch $b$, that extends laterally from the pulley C.

F represents a shaft parallel with the shaft A, on which is a pulley, F', and G is a belt connecting the pulleys C and F'.

H represents a shaft or pulley, and I a belt connecting said shaft or pulley H with the pulley E.

K K' represent segmental racks fixed on the support A', for the engagement, respectively, of the handles of the levers B' D', whereby the eccentrics B D and their respective pulleys C E are held in position. The said eccentrics B D being arranged with their swells uppermost, the movement of the lever B' in the direction of the arrow, Fig. 1, will turn the shaft and eccentric in the same direction, thereby moving the pulley C bodily in the same direction, so that the belt G shall be tightened, while the relative position of the pulley C to its center of rotation—the center of the eccentric B—remains unchanged; hence said pulley C will run as evenly as before. The clutch $b$ moves in the groove $a$ of the pulley E as the pulley C is thus adjusted, and hence the latter is unaffected.

To tighten the belt I the lever D' also is moved in the direction of the arrow, Fig. 1, whereby the eccentric-sleeve D is turned in the same direction, with the effect of moving the pulley E bodily in the same direction, but without changing the relative position of the said pulley E with its center of rotation, the eccentric-sleeve D. When thus tightening the belt I the clutch or stud $b$, moving in the groove $a$, enables the pulley E to be moved independently of the pulley C. When revolving, however, the two pulleys C E are revolved together because of the said clutch $a$ $b$.

It is not necessary that the two eccentrics and pulleys herein shown be used on all occasions, it being evident that the belts G I can be tightened independently of each other by their respective eccentrics and pulleys B C and D E.

By the application of this device the tension of belts can be adjusted with the utmost nicety, and the delay and expense attending the unlacing, shortening, and relacing be entirely avoided.

Having thus fully described my invention, I claim as new and desire to secure by Letters Patent—

In belt-tighteners, the combination of the shaft A, having the rigid eccentric B, provided with lever B', the loose eccentric-sleeve D, provided with lever D', and the loose pulleys C E, connected by a groove and clutch-stud, as shown and described.

HORACE DAVID HICKS.

Witnesses:
HAZEN W. FISKE,
FRED. C. FEARON.